Oct. 21, 1924.  
A. KÖNIG  
1,512,031  
WORKPIECE HOLDER FOR SAW BLADE MANUFACTURING MACHINES  
Original Filed Aug. 28, 1918
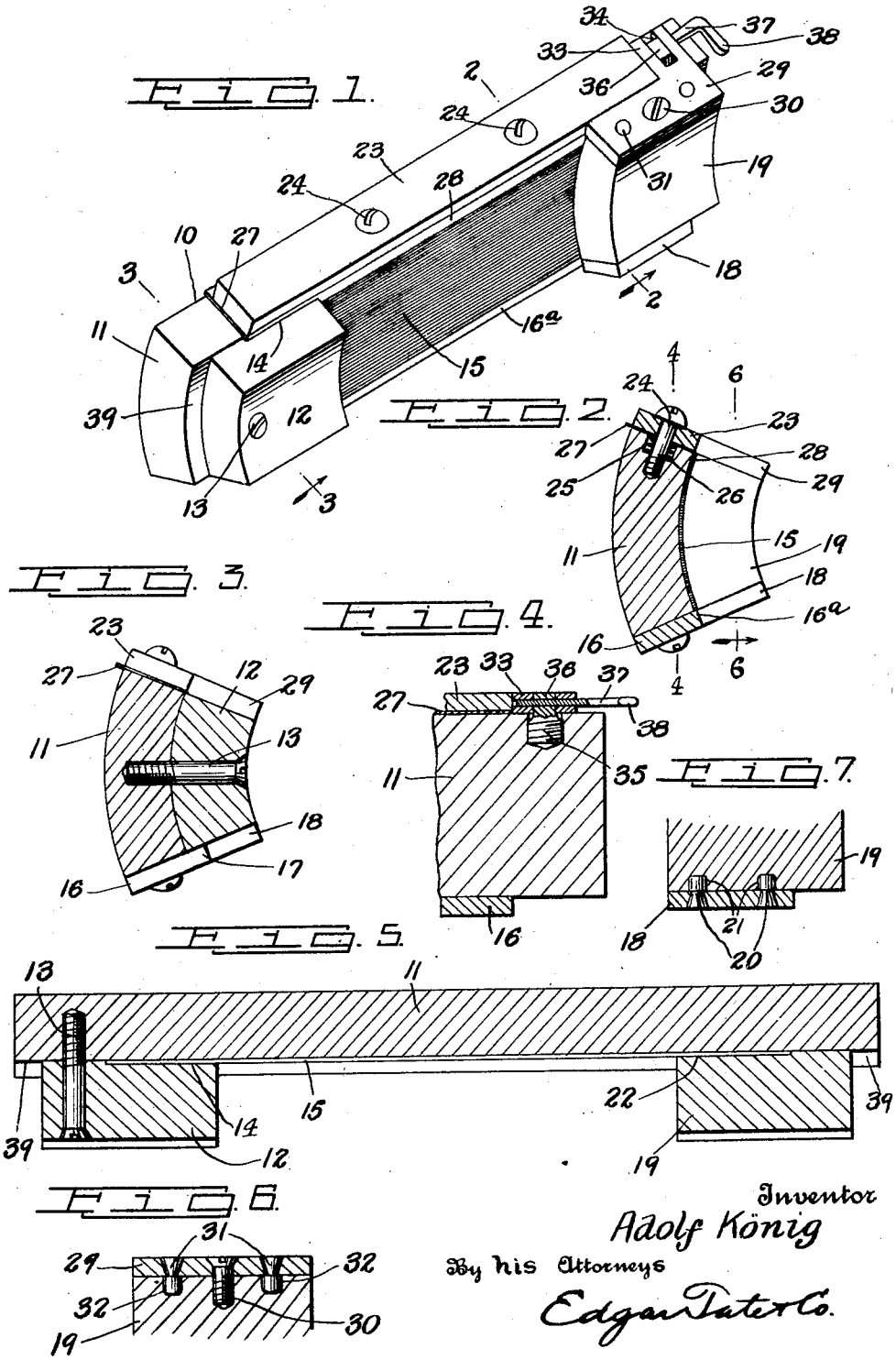
Inventor  
Adolf König  
By his Attorneys  
Edgar Tate & Co.

Patented Oct. 21, 1924.

1,512,031

UNITED STATES PATENT OFFICE.

ADOLF KÖNIG, OF HOBOKEN, NEW JERSEY, ASSIGNOR TO HANS K. LORENTZEN, OF NEW YORK, N. Y.

WORKPIECE HOLDER FOR SAW-BLADE-MANUFACTURING MACHINES.

Application filed August 28, 1918, Serial No. 251,763. Renewed March 17, 1924.

*To all whom it may concern:*

Be it known that I, ADOLF KÖNIG, a citizen of the United States, and residing at Hoboken, in the county of Hudson and State of New Jersey, have invented certain new and useful Improvements in Workpiece Holders for Saw-Blade-Manufacturing Machines, of which the following is a specification, such as will enable those skilled in the art to which it appertains to make and use the same.

This invention relates to machines for manufacturing saw blades and particularly to the workpiece holders employed in such machines, and the object of the invention is to provide a device of the class specified which is so constructed as to facilitate the attachment and detachment of saw blade blanks therewith; and a further object being to provide a device of the class specified which is simple in construction and operation and efficient in use; and with these and other objects in view the invention consists in a device of the class specified, constructed and operating as hereinafter described and claimed.

The invention described and claimed herein is an improvement on that described and claimed in a prior application filed by me January 29, 1918, Serial No. 242,550, and is fully disclosed in the following specification, of which the accompanying drawing forms a part, in which the separate parts of my improvement are designated by suitable reference characters in each of the views, and in which:—

Fig. 1 is a perspective view of a workpiece holder showing the same supporting a number of saw blade blanks;

Fig. 2 a transverse section on the line 2—2 of Fig. 1;

Fig. 3 is a transverse section on the line 3—3 of Fig. 1;

Fig. 4 a partial section on the line 4—4 of Fig. 2;

Fig. 5 a central longitudinal section of the holder as shown in Fig. 1;

Fig. 6 a partial section on the line 6—6 of Fig. 2; and,

Fig. 7 a view similar to Fig. 6 but showing other details of construction.

In the practice of my invention, I provide a workpiece holder 10, comprising an elongated arc-shaped body portion 11. An arc-shaped block 12 is secured to one end of the body portion 11 or the concave face thereof by means of a screw 13. The block 12, or its inner concave face is reduced as shown at 14 to form a space to receive one end of a plurality of saw blade blanks 15, as clearly shown in Fig. 5 of the drawing.

An elongated bottom plate 16 is secured to the bottom of the body portion 11, said plate being of greater width than the transverse width of the body portion to form a seat 16ª for the saw blade blanks 15, and the end portion of said plate beneath the block 12 is enlarged to form a seat 17 for said block, and this prevents the turning of said block on the screw as will be readily understood.

The other end portion of the plate 16 is provided with an extension 18, which forms a seat for an arc-shaped block 19 at the corresponding end of the body portion 11, and said seat 18 is provided with two upwardly directed pins 20, which fit in corresponding apertures 21 in the block 19 and serve to hold said block in position. The inner convex face of the block 19 is reduced as shown at 22 to form a chamber to receive the other ends of the saw blade blanks 15.

A top plate 23 is secured to the top face of the body portion 11 by screws 24 secured in said body portion, and the upper face of said body portion around said screws is provided with enlarged recesses as shown at 25 and a spiral spring 26 is placed therein and serves to raise the plate 23 and a sheet metal strip 27 between said plate and the top face of the body portion when the screws 24 are loosened. The sheet metal strip 27 is provided with a downwardly directed flange 28 which is adapted to bear on the top saw blade blank 15 and hold said blanks in firm position between the blocks 12 and 19 and against the seat 16ª.

An L-shaped plate 29 is secured to the top face of the block 19 by a screw 30 and by two pins 31 at the opposite sides of said screw, which are adapted to enter recesses 32 in the top face of the block 19. The backwardly directed portion 33 of the plate 29 is U-shaped in form, or provided with an elongated aperture 34 and a screw 35 is secured to the top face of the body portion 11, and the head of the screw is angular in form as shown at 36 and adapted to operate in the aperture 34, and the L-shaped plate 29 and block 19 are locked into engagement with the body portion 11 by a tapered pin 37 passed through the U-shaped end 33 of the plate 29 and through the angular head 36 of the screw 35 and by grasping the finger piece 38 of the pin 37 and withdrawing said pin, the block 19 may be removed from the seat 18, as will be readily understood.

It will be noted that the blocks 12 and 19 are set inwardly of the ends of the body portion 11 to form extensions 39 for said body portion, which facilitates the connection of the workpiece holder 10, or the body portion 11 thereof, in connection with a saw blade machine of a class similar to that shown in said prior application.

In the use of the device the block 12, the bottom plate 16 and the top plate 23 with the strip 27 are normally connected with the body portion 11, the strip 27 and top plate 23 being in a raised position and held in such position by the springs 26 on the screws 24. With the parts in the position above set out the desired number of saw blade blanks 15 are placed between the block 12 and body portion 11, and between the seat 16ª and the top face of the body portion 11 in the usual manner, after which the block 19 with the L-shaped plate 29 secured thereto is placed upon the seat 18 by passing the pins 20 into the apertures 21 in said block and the U-shaped end 33 of the plate 29 is passed over the angular head 36 of the screw 35, after which the pin 37 is passed through said end of the plate and said head to secure the block 19 and the separate parts thereof in firm connection with the body portion 11. In order to firmly secure the saw blade blanks or workpieces 15, the screws 24 are tightened or moved inwardly to force the flange portion 28 of the strip 27 against the upper blank 15 as is clearly illustrated in Fig. 2 of the drawing.

When the device is fully assembled with the blanks or workpieces 15 therein, or as illustrated in Fig. 1, the same is connected with a machine of the class specified, and when the blanks are cut and the device removed from the machine the saw blades may be removed by withdrawing the pin 37 and removing the block 19 from the seat 18 and by loosening the screws 24. While I have certain details of construction for carrying my invention into effect, it will be understood that my invention is not limited to such details, and various changes therein and modifications thereof may be made, within the scope of the appended claims, without departing from the spirit of my invention or sacrificing its advantages.

Having fully described my invention, what I claim as new and desire to secure by Letters Patent, is:—

1. In a device of the class described, a body portion, a block secured to one end thereof, another block detachably secured to the other end of said body portion, means for retaining saw blade blanks between said blocks and said body portion, and means extending longitudinally of the body portion for holding said blanks firmly in such position.

2. In a device of the class described, a body portion, a block secured to one end thereof, another block secured to the other end of said body portion, means whereby a plurality of saw blade blanks may be placed between said blocks and said body portion, means at the bottom of the body portion for supporting said blanks in such position, and means at the top of said body portion for holding said blanks firmly in such position.

3. In a device of the class described, a body portion, a block secured to one end thereof, another block secured to the other end of said body portion, means whereby a plurality of saw blade blanks may be placed between said blocks and said body portion, means at the bottom of the body portion for supporting said blanks in such position, and tensionally controlled means for holding said blanks firmly in such position.

4. In a device of the class described, a body portion, a block secured to one end thereof, a plate secured to the bottom of the body portion one end of which is provided with a seat for said block, the other end of said plate being provided with a seat, a block mounted on said last named seat, means for preventing the turning of said block on said seat, means for detachably connecting the top portion of said last named block with the body portion, means whereby a plurality of saw blade blanks may be placed between said blocks and said body portion, and means for holding said blanks firmly in such position.

5. In a device of the class described, a body portion, a block secured to one end thereof, a plate secured to the bottom of the body portion one end of which is provided with a seat for said block, the other end of said plate being provided with a seat, a block mounted on said last named seat, means for preventing the turning of said block on said seat, means for detachably connecting the top portion of said last named block with the body portion, means whereby a plurality of saw blade blanks may be placed between said blocks and said body portion, means at the bottom of the body portion for supporting the blanks in such position, and means at the top of the body portion for rigidly securing said blanks in position.

6. In a device of the class described, a body portion, a block secured to one end thereof, a plate secured to the bottom of the body portion one end of which is provided with a seat for said block, the other end of said plate being provided with a seat, a block mounted on said last named seat, pins secured to said seat and passed into said block for holding it against displacement on said seat, an L-shaped plate secured to the top of said last named block, said plate being provided with a backwardly directed U-shaped portion, a screw secured to the top of the body portion directly beneath said U-shaped portion of the plate, said screw being provided with an angular head engaged by said U-shaped portion, and a pin passed through said head and said U-shaped portion for detachably securing said block with said body portion, and means whereby a plurality of saw blade blanks may be firmly supported between said blocks and said body portion.

7. In a device of the class described, a body portion, a block secured to one end thereof, a plate secured to the bottom of the body portion one end of which is provided with a seat for said block, and the other end of said plate being provided with a seat, a block mounted on said last named seat, pins secured to said seat and passed into said block for holding it against displacement on said seat, an L-shaped plate secured to the top of said last named block, said plate being provided with a backwardly directed U-shaped portion, a screw secured to the top of the body portion directly beneath said U-shaped portion of the plate, said screw being provided with an angular head engaged by said U-shaped portion, and a pin passed through said head and said U-shaped portion for detachably securing said block with said body portion, means whereby a plurality of saw blade blanks may be placed between said blocks and the body portion, means at the bottom of the body portion for supporting said blanks, and a plate secured to the top of the body portion against tensional devices and adapted to hold said blanks in firm position.

8. In a device of the class described, an elongated body portion having one of its faces concaved, means for supporting a plurality of saw blade blanks on the concaved face of said body portion, and means movably mounted on the body portion for holding said blanks firmly in such position.

9. In a device of the class described, a body portion having one of its longitudinal faces concaved, means for supporting a plurality of saw blade blanks on the concaved face, and means associated with the body portion for holding said blanks in clamped position on said supporting means and against the concaved face of the body portion.

10. In a device of the class described, a body portion having an exposed concaved face, a seat extending beyond the lower edge of the concaved face for supporting a plurality of blanks, and means associated with the opposite edge of the body portion for holding the blanks in position on the seat and against the concaved face of the body portion.

In testimony that I claim the foregoing as my invention I have signed my name in presence of the subscribing witnesses this 26th day of August 1918.

ADOLF KÖNIG.

Witnesses:
   C. E. MULREANY,
   H. E. THOMPSON.